(12) United States Patent
Kudli et al.

(10) Patent No.: US 11,635,753 B1
(45) Date of Patent: Apr. 25, 2023

(54) REMAINING USEFUL LIFE PREDICTION FOR MACHINE COMPONENTS

(71) Applicant: DIMAAG-AI, Inc., Fremont, CA (US)

(72) Inventors: Rajaram Kudli, Bengaluru (IN); Satish Padmanabhan, Sunnyvale, CA (US); Fuk Ho Pius Ng, Portland, OR (US)

(73) Assignee: DIMAAG-AI, Inc., Fremont, CA (US)

( * ) Notice: Subject to any disclaimer, the term of this patent is extended or adjusted under 35 U.S.C. 154(b) by 0 days.

(21) Appl. No.: 17/819,840

(22) Filed: Aug. 15, 2022

(51) Int. Cl.
*G05B 23/02* (2006.01)

(52) U.S. Cl.
CPC ....... *G05B 23/0283* (2013.01); *G05B 23/024* (2013.01); *G05B 23/0227* (2013.01)

(58) Field of Classification Search
CPC ............ G05B 23/0283; G05B 23/0227; G05B 23/024
See application file for complete search history.

(56) References Cited

U.S. PATENT DOCUMENTS

| | | | |
|---|---|---|---|
| 8,005,771 | B2 | 8/2011 | Chen et al. |
| 2006/0074828 | A1 | 4/2006 | Heumann et al. |
| 2015/0377739 | A1* | 12/2015 | Andersson ......... G05B 23/0283 |
| | | | 702/182 |
| 2019/0042675 | A1* | 2/2019 | Martin .................... G06N 20/00 |
| 2020/0103894 | A1* | 4/2020 | Cella .......................... H04L 1/18 |
| 2021/0365793 | A1 | 11/2021 | Surya et al. |

* cited by examiner

*Primary Examiner* — Manuel L Barbee
(74) *Attorney, Agent, or Firm* — Polygon IP, LLP

(57) ABSTRACT

Remaining useful life may be estimated for a machine component by training a prediction model, even when limited data from actual failures is available. Feature data such as sensor readings associated with a mechanical process may be collected over time. Such readings may be paired with estimates of remaining useful life, for instance as extracted from unstructured text of maintenance records. Such data may be used to train and test the prediction model.

19 Claims, 10 Drawing Sheets

REMAINING USEFUL LIFE PREDICTION FOR MACHINE COMPONENTS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to modeling and prediction related to mechanical components and more specifically to the prediction of remaining useful life of mechanical components.

BACKGROUND

Machine learning is commonly used to predict data values. For instance, a prediction model is trained using a set of predictor values and corresponding observed outcome values. Such training often involves comparing predicted outcome values against observed outcome values to determine one or more error terms and then adjusting one or more model parameters to reduce the one or more error terms.

One type of outcome predicted by machine learning methods is mechanical component failure. Mechanical parts eventually wear out, but the precise time of failure is typically unknown in advance. This presents companies with a difficult problem. Replacing a component that still has useful life remaining is wasteful and costly. However, allowing a component to fail may lead to other costs such as damage to a machine, manufacturing defects in output produced by the machine, or process delays while the failed component is replaced due to dependencies between machines and components. Accordingly, improved techniques for predicting remaining useful life of mechanical components are desired.

Overview

According to various embodiments, systems, apparatus, methods and computer program products described herein facilitate the prediction of remaining useful life for mechanical components. In some embodiments, a designated time series data set associated with a mechanical process performed by a designated machine including a designated component corresponding with a designated component type may be received. Designated estimated condition information for the designated component may be identified by analyzing a one or more maintenance records associated with the designated machine. Each of the one or more maintenance records may be associated with a respective point in time. An estimated remaining useful life for the designated component may be determined by applying a pre-trained prediction model to the designated time series data and the designated estimated condition information. The pre-trained prediction model being trained to predict historical estimated condition information for a plurality of components of the designated component type using historical time series data associated a plurality of machines that collectively include the plurality of components. The estimated remaining useful life may be stored on a storage device.

According to various embodiments, the designated time series data may include process monitoring data collected over time from one or more sensors associated with the designated machine. The designated time series data may include process monitoring data indicating values for one or more control settings for the designated machine over time. The designated time series data may include process outcome data characterizing one or more outcomes of the mechanical process. The process outcome data may include product quality data for a product produced by the mechanical process. The product quality data may include a defect rate associated with the product. The one or more maintenance records may include a designated maintenance record identifying a historical estimate of remaining useful life for the designated component at a designated point in time. The pre-trained prediction model may be trained using mechanical component failure event data identifying a plurality of failure dates for a subset of the plurality of components.

BRIEF DESCRIPTION OF THE DRAWINGS

The included drawings are for illustrative purposes and serve only to provide examples of possible structures and operations for the disclosed inventive systems, apparatus, methods and computer program products for remaining useful life detection via record data. These drawings in no way limit any changes in form and detail that may be made by one skilled in the art without departing from the spirit and scope of the disclosed implementations.

DETAILED DESCRIPTION

Techniques and mechanisms described herein provide for predicting remaining useful life of mechanical components. Conventional techniques for predicting remaining useful life require data that includes a large number of component failures or end-of-life instances. However, modern mechanical parts have a lengthy lifespan. Further, actual component failures can be costly, leading companies to replace parts with significant remaining useful life out of an abundance of caution. Accordingly, actual component failure or end-of-life instances tend to be rare in sophisticated, well-maintained, automated plants with well-established proactive/scheduled maintenance plans. Thus, conventional techniques generally fail to produce accurate predictions of remaining useful life for mechanical components. In contrast to conventional techniques, techniques and mechanisms described herein are broadly applicable to a range of contexts in which actual component failure or end-of-life instances are rare.

Conventional approaches to machine maintenance often rely on analysis such as mean time between failure (MTBF). Such approaches can help to ensure that machines are serviced and parts are replaced with sufficient regularity that failures are relatively rare. However, such approaches often involve replacing parts that still have significant useful life remaining, to reduce the probability of failure. Accordingly, such approaches force companies to incur both opportunity costs and, occasionally, costs of replacing prematurely failed parts.

According to various embodiments, techniques and mechanisms described herein provide a comprehensive process for estimating remaining useful life of mechanical components from information such as proactive/scheduled maintenance records. For instance, maintenance records created or updated when machines are serviced may indicate information such as the state of components at the time of maintenance or replacement, actual operational life until a replacement instance, and the like. Such information can be combined with data such as process outcomes indicating, for instance, quality or defect levels of products being produced. In addition, such information can be combined with information from sensors or control features of the process being controlled. In this way, the remaining useful life can be estimated despite the relative rarity of actual failure events.

According to various embodiments, techniques and mechanisms described herein may be applied to a wide variety of contexts. For example, techniques and mechanisms described herein may be applied to turbines within air control units. As another example, techniques and mechanisms described herein may be applied to mechanical components within a metal casting process.

Figure 1:
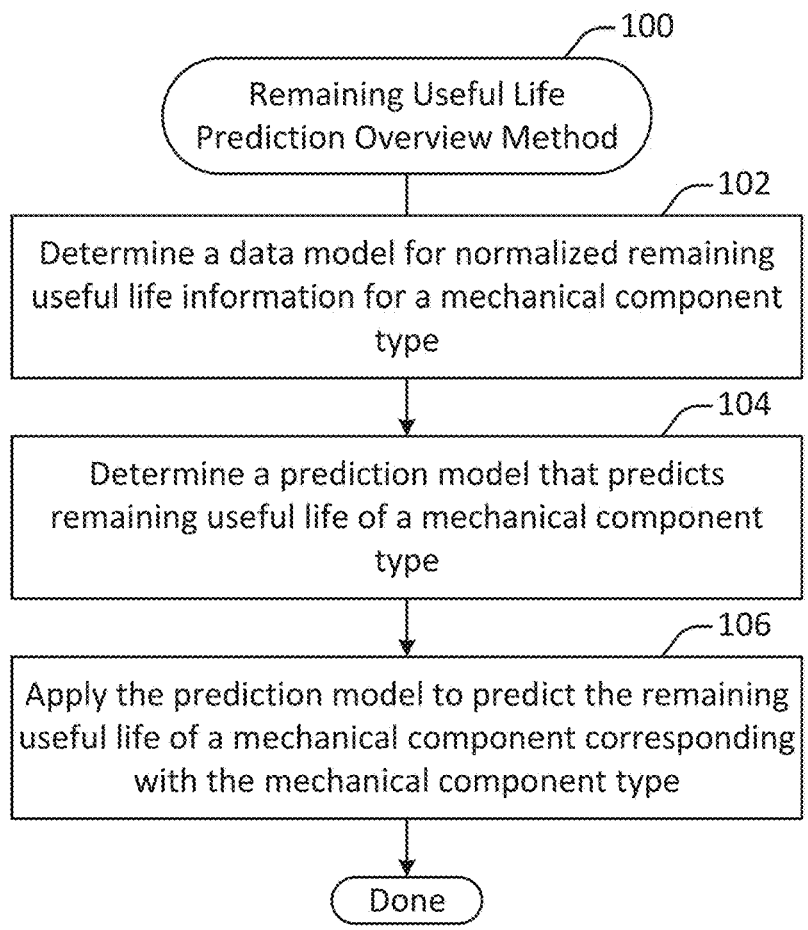
FIG. 1 illustrates an example of an overview method for remaining useful life detection, performed in accordance with one or more embodiments.

FIG. 1 illustrates an example of an overview method 100 for remaining useful life prediction, performed in accordance with one or more embodiments. The method 100 may be performed on any suitable computing device. For instance, the method 100 may be performed on a controller in communication with one or more mechanical devices that collectively form part of a manufacturing process. The method 100 may be used to predict the useful life remaining for a component within a machine, even while the component remains in service.

A data model for normalizing remaining useful life information for a mechanical component type is determined at 102. According to various embodiments, the data model may be determined by combining data from different sources to create a model suitable for use in estimation. Such data sources may include maintenance records, processing monitoring data, process outcome data, or other types of information sources. Determining the data model may involve normalizing these data sources to create a data set suitable for prediction. Additional details regarding the determining a data model are discussed with respect to the method 200 shown in FIG. 2.

A prediction model that predicts remaining useful life of a mechanical component type is determined at 104. According to various embodiments, determining the prediction model may involve applying a machine learning procedure to the data model determined at 102 to produce a trained prediction model. Additional details regarding the determining a prediction model are discussed with respect to the method 400 shown in FIG. 4.

The prediction model is applied at 106 to predict the remaining useful life of a mechanical component corresponding with the mechanical component type. According to various embodiments, applying the prediction model may involve determining data for the mechanical component that matches the data model determined at 102, and then applying the prediction model determined at 104 to that that data. The prediction may result in a determination such as whether or not to replace the mechanical component.

Figure 10:
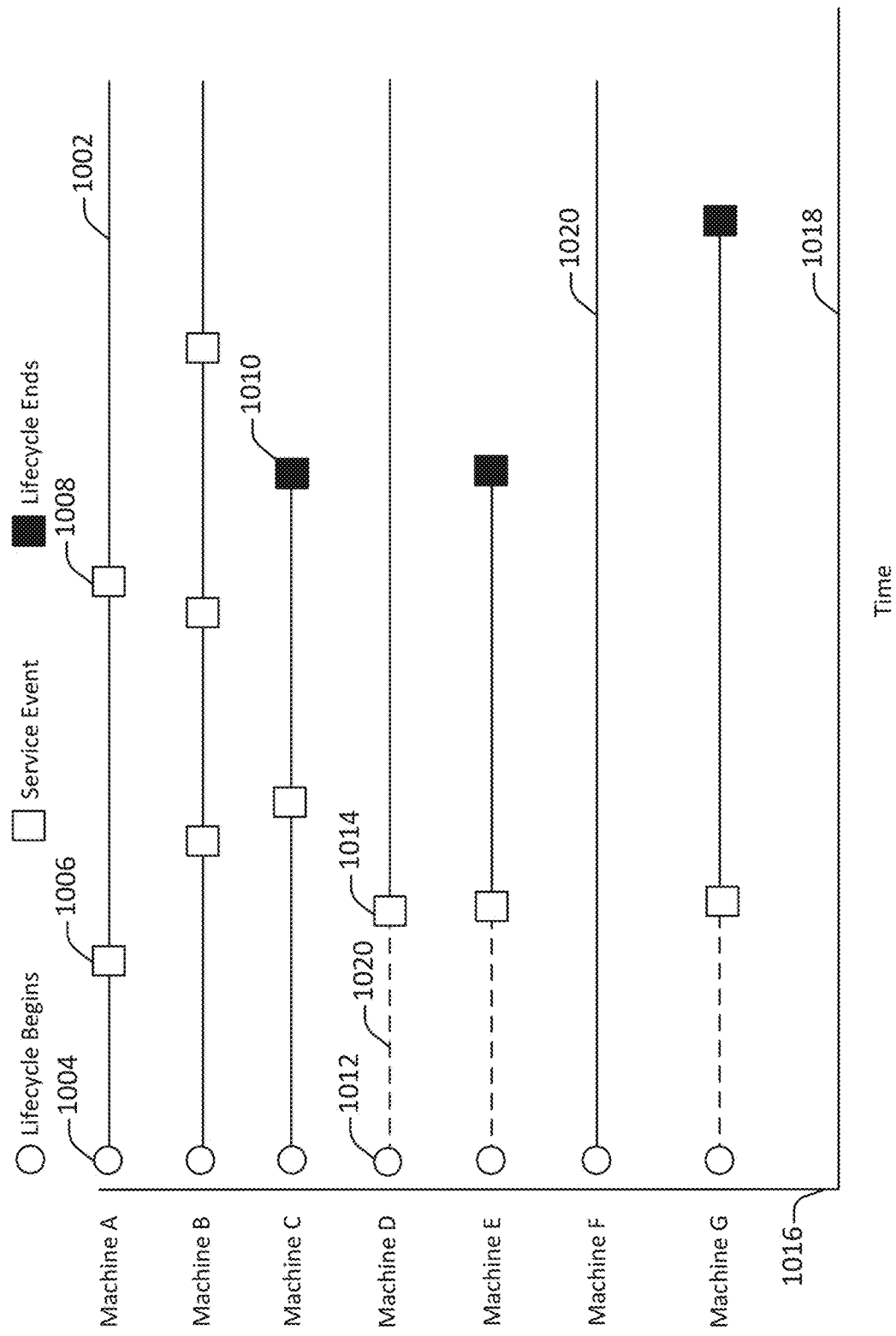
FIG. 10 illustrates a diagram that represents service event data for machines, generated in accordance with one or more embodiments.

Various techniques and mechanisms are described herein with reference to service event data. FIG. 10 illustrates a diagram that represents service event data for machines, generated in accordance with one or more embodiments. In FIG. 10, the y-axis 1016 shows lifecycle information for different machines. The x-axis 1018 shows time. Time may be measured in months, days, hours, or any suitable unit of measure, depending on the granularity of the available event data.

According to various embodiments, techniques and mechanisms described herein may be used to estimate remaining useful life in a variety of contexts. For example, the machines shown in FIG. 10 may correspond to automobiles, machines within a machine shop, instances of a particular type of machine component, or any other suitable machine or component for which data is available.

According to various embodiments, machines may enter service all at the same time, or at different times. However, when machines enter service at different times, the data may be normalized as shown in FIG. 10 so that time is measured from the beginning of each machine's lifecycle. Alternatively, the data may be analyzed without such normalization.

Service lifecycle data for Machine A is shown at 1002. The lifecycle of Machine A begins at 1004. According to various embodiments, the point at which a machine's lifecycle begins may correspond to any of a variety of events, depending on the context and the availability of data. For instance, the machine's lifecycle may begin at the time it is sold, the time that it enters service, or the time at which data for the machine is first available.

In some embodiments, a machine may be associated with service event data characterizing one or more service events for the machine. For instance, the machine A is associated with service events 1006 and 1008. Such service events may be associated with records that provide various information about the machine and/or individual components within the machine at the time of service. Service event data may include unstructured text data, semi-structured data, structured data, or a combination thereof.

In some embodiments, a service event may correspond to unscheduled maintenance. For instance, a service event may occur when a component within a machine has failed. Alternatively, a service event may be associated with routine service in which one or more components associated with the machine are adjusted, preemptively replaced, or evaluated.

In particular embodiments, service event data may explicitly identify an estimate of remaining useful life for an individual component or the machine as a whole. However, in some instances such estimates may not be identified. When an explicit estimate of remaining useful life is absent, such information may potentially be inferred from other information such as a description of component conditions.

In some implementations, service lifecycle information may identify the end of a machine's lifecycle, such as the service lifecycle termination event 1010. A machine's lifecycle may be terminated when its remaining useful life has been exhausted, such as when the machine has failed. Alternatively, a machine may be removed from service or repurposed before the end of its useful life, for instance to avoid a disruptive mechanical failure. In some situations, the end of a machine's lifecycle may be associated with data identifying the state of the machine and/or its constituent components when the machine is removed from service. However, in other situations such information may not be available.

According to various embodiments, a machine may be associated with initial service data dating from the beginning of its lifecycle, for instance at the event 1004 at the beginning of the lifecycle of machine A. However, in other situations a machine may enter service prior to the availability of service records. For example, machine D entered service at 1012. However, the first service record occurred at 1014, after the period of time 1020 during which data was unavailable. Nevertheless, information about when machine D entered service may be helpful in formulating a prediction model since the beginning of machine D's lifecycle at 1012 provides evidence as to the overall length of machine D's useful life.

In some implementations, information may be known about when a machine entered service, but the machine may not be associated with service event data. For instance, the machine F is not associated with any service events. Information about the lifespan of machine F may nevertheless be helpful in formulating a prediction model since machine F provides evidence of useful life in the absence of service events.

Figure 2:
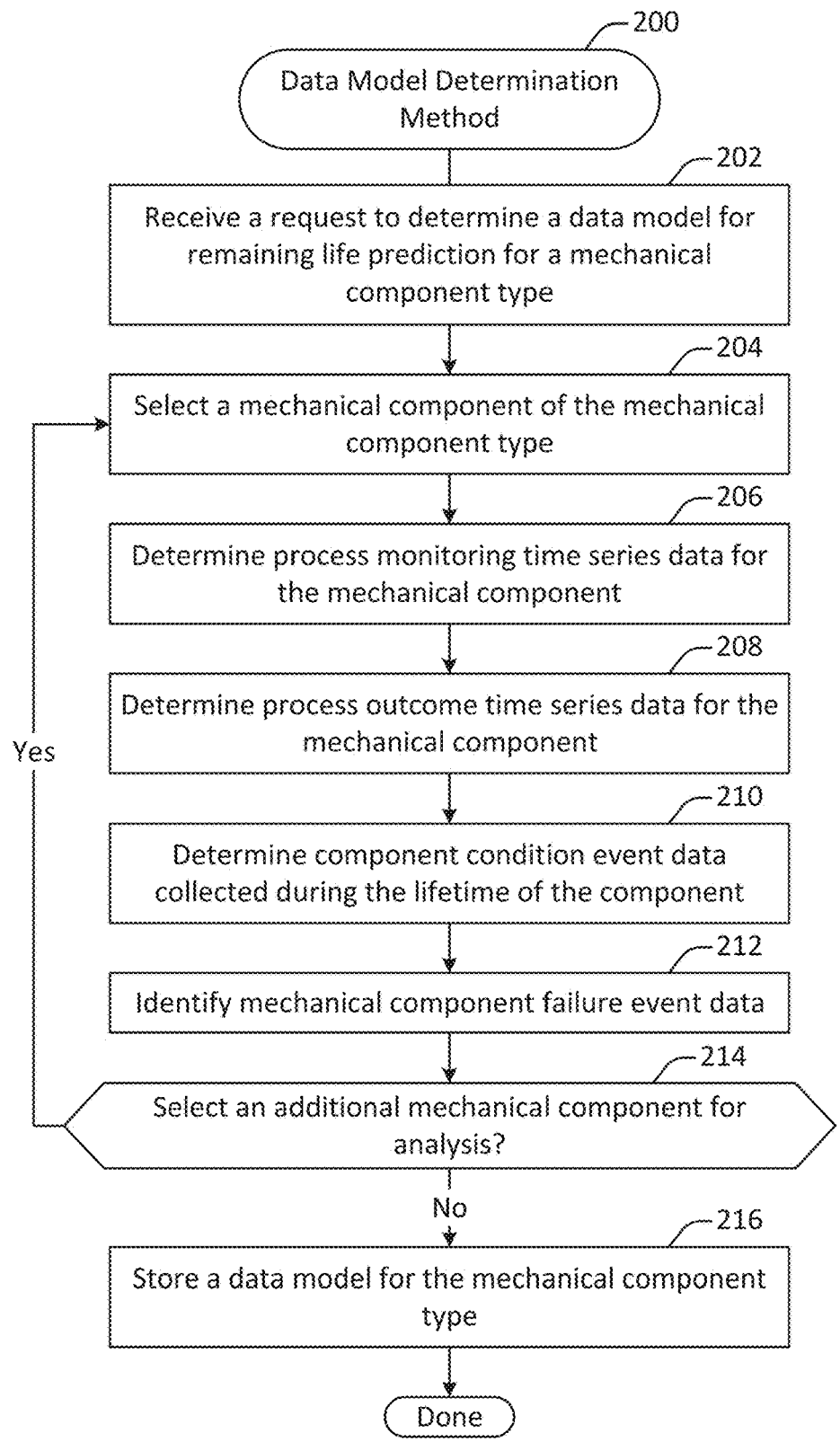
FIG. 2 illustrates an example of a method for determining a data model, performed in accordance with one or more embodiments.

FIG. 2 illustrates an example of a method 200 for determining a data model, performed in accordance with one or more embodiments. The method 200 may be performed on any suitable computing device. For instance, the method 200 may be performed on a controller in communication with one or more mechanical devices that collectively form part of a manufacturing process.

A request to determine a data model for remaining life prediction for a mechanical component type is determined at 202. According to various embodiments, the request may be generated based on user input, an automated process, or some combination thereof. For example, a data model for remaining life prediction may be generated periodically, for instance when new data becomes available. As another example, a data model may be generated at the request of a user such as an administrator.

In some implementations, the request may indicate a particular type of mechanical component. As used herein, the term "mechanical component" refers to any physical component that is used in a mechanical process. Thus, the term "mechanical component" encompasses machine parts that have elements that move but also encompasses any component of a machine, including those without elements that move. For instance, a mechanical component may be a turbine, a turbine blade, a motor, a component within a motor, an electrical switch, or any other type of physical device or device part.

In some embodiments, the request may be generated automatically for each of a set of mechanical component types. For example, a set of component types that make up a particular machine or process may be determined, for instance based on user input or on an analysis of maintenance records. Then, each of the constituent parts for which data exists may be analyzed separately.

A mechanical component of the mechanical component type is selected at 204. In some embodiments, the selected mechanical component may be a particular instance of the component type. For instance, the component type may be a turbine, while the selected component may be a particular turbine within a particular cooling unit.

According to various embodiments, mechanical components may be selected for analysis in various ways and in various orders. For instance, a manufacturing plant may maintain records of devices and/or device components within the plant, and these records may be queried to select particular mechanical components for analysis.

Process monitoring time series data for the mechanical component is determined at 206. According to various embodiments, the process monitoring time series data may include any data collected over time that is associated with the performance or control of the mechanical component itself or a machine in which it is situated. For example, the process monitoring time series data may include information collected from one or more sensors such as temperature or pressure sensors. As another example, the process monitoring time series data may include other information about process performance such as rotations per minute, torque produced by an engine, power used by a machine, or other such metrics. As yet another example, the process monitoring time series data may include control information such as a configuration setting applied to the machine at a particular point in time.

Process outcome time series data for the mechanical component is determined at 208. According to various embodiments, the process outcome time series data may include any information about the outcome of a mechanical process over time. Such information may include, but is not limited to: a rate of product defects in a product produced by the mechanical process, a production rate of a product produced by the mechanical process, a power output level of machine such as an engine or motor, and/or any other observable output from a mechanical process.

Component condition event data collected during the lifetime of the component is determined at 210. According to various embodiments, the component condition information may include any information about the component observed at a particular point in time. For example, the component condition information may include the age of the component as of a particular point in time, or analogously a date on which the component first entered service. As another example, the component condition information may include an observed condition of the component during a scheduled or unscheduled maintenance event for the machine in which the component is situated, a maintenance event for a component of the machine, or a maintenance event for the component itself. For instance, when performing maintenance of a machine, maintenance workers commonly note the condition of various components within the machine, often including even components not subject to maintenance. In many records, maintenance workers provide estimates of remaining useful life of components. Such information may be extracted from maintenance records, for instance via natural language processing. A component condition event may be associated with a designated point in time, such as a point in time when maintenance was performed.

One or more mechanical component failure events are identified at 212. According to various embodiments, a mechanical component failure event identifies a point in time at which a mechanical component has failed. Such an event may be included in maintenance records, as discussed with respect to operation 210.

According to various embodiments, information stored in maintenance records, including but not limited to failure event data, may be stored in a structured, unstructured, or semi-structured manner. Accordingly, information stored in maintenance records may be identified in any of various ways, ranging from querying a database system to performing natural language processing on maintenance documents in text form.

A determination is made at 214 as to whether to select an additional mechanical component for analysis. According to various embodiments, additional mechanical components may continue to be selected until available or suitable data on mechanical components has been processed. In some implementations, operations 204-214 may be performed in parallel.

If it is determined not to select an additional mechanical component for analysis, then at 216 a data model for the mechanical component type are stored. According to various embodiments, the data model may be a normalized version of the information determined and identified in operations 206-212. For instance, data collected from different sources and originating in different formats may be organized in a consistent manner. The particular ways in which data is stored in a normalized format may be determined based on the context, such as based on characteristics of the particular data that has been collected. However, some examples of normalization processes are provided below for the purpose of illustration.

In some embodiments, time series data may be arranged along a common unit of time, such as measurements taken once per minute or once per hour. For example, different time series data sets may be collected at different time intervals, which may be merged. As another example, event data identified at 210 and/or 212 may be placed along the common unit of time.

In some embodiments, data may be summarized. For instance, data may be collected from sensors at high frequency, such as once per second. However, remaining useful life estimation may be conducted on a much longer time scale, for instance with components having an average useful life on the order of months or years. Accordingly, in such a situation, high frequency data may be averaged or selected to reduce the volume of data stored.

In particular embodiments, data may be aggregated at different levels. For example, one level of aggregation may be implemented at the data source. A particular observation may include one or more statistics such as the mean, median, standard deviation, minimum, and/or maximum over some period of time, such as every minute, second, or fraction of a second. As another example, another level of aggregation may occur at the observation window, when data received from the source is aggregated over a moving window to eliminate high frequency changes. As yet another example, seasonality reduction may be applied to the data to remove seasonal trends, such as predictable changes that occur over any interval along which the process normally tends to vary.

According to various embodiments, one or more of the operations shown in FIG. 2 may not be performed for one or more of the components. For example, mechanical component failure event data is not present for components that have not yet failed. As another example, some time series data may be available for some machines or components but not for others.

According to various embodiments, the operations shown in FIG. 2 may be performed in a different order than that shown. For example, any of operations 206-212 may be performed for multiple components simultaneously. For instance, process monitoring time series data may be determined for all components before determining process outcome time series data for all components, or vice versa. As another example, time series data may be determined after, or in parallel to, identifying condition of component event data or mechanical component failure event data.

Figure 3A:
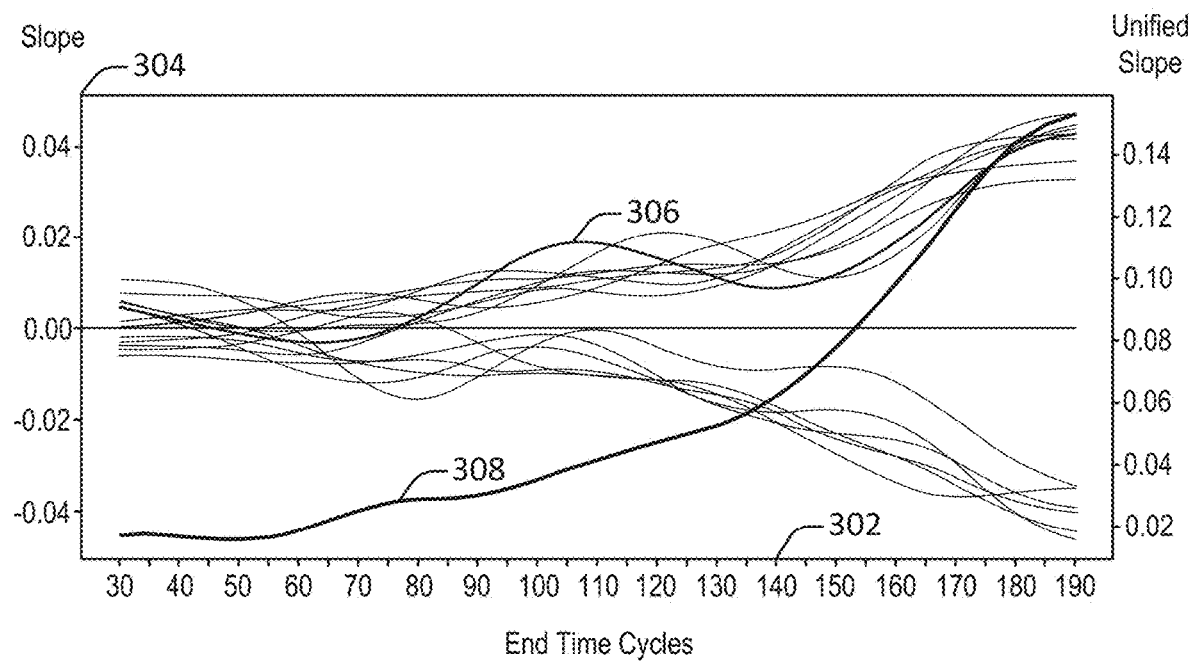
FIG. 3A and FIG. 3B illustrate plots related to the generation of data for the prediction of remaining useful life, generated in accordance with one or more embodiments.
Figure 3B:
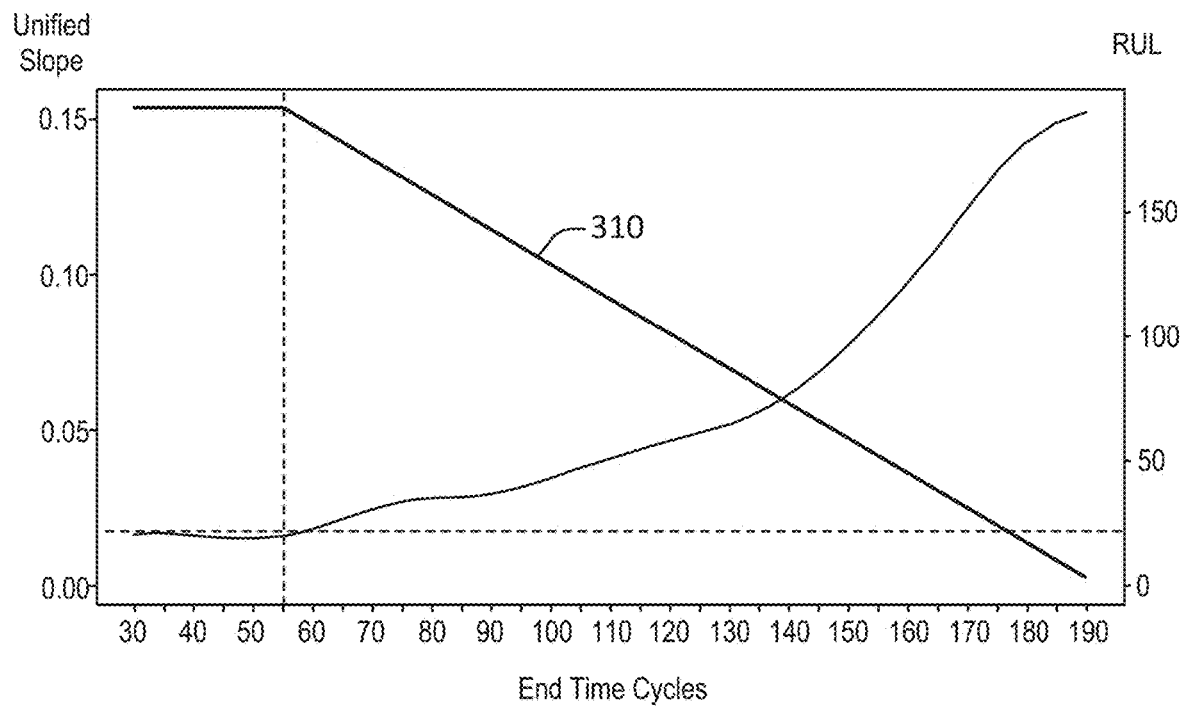

FIG. 3A and FIG. 3B illustrate plots related to the generation of data for the prediction of remaining useful life, generated in accordance with one or more embodiments. In FIG. 3A, the x-axis 302 represents a time cycle associated with a process related to a particular machine that has failed. The time cycle may correspond to clock time or may be derived from the process itself. For instance, the time cycle may be a number of units produced or a number of iterations of some mechanical element. The left y-axis 304 represents a slope indicating a rate of change over time of various predictor values. To aid in comparison, the slopes are normalized to the same scale. Each of the slopes is then plotted over time. For example, the slope associated with one predictor value is plotted at 306.

In FIG. 3A, the device failed at time cycle 190, at which point sensor data is no longer available. To combine information from different sensors, a unified slope 308 is determined. It can be seen in FIG. 3A that the slope of some sensor values increased, while the slope of other sensor values decreased, as the machine moved closer to the point of failure. The unified slope 308 normalizes each slope to be increasing at the time of failure, and then averages these values across the different sensors.

In FIG. 3B, the actual remaining useful life for the mechanical. Because the x-axis is on a linear scale and the time of failure is known to have occurred at time cycle 190, the remaining useful life 310 is a mechanically a linear trend over time. Because drift in the unified slope 308 is first observed at cycle 55, the linear trend degrades from time cycle 55 to time cycle 190. Thus, for a point in time between cycle 55 and cycle 190, inclusive, data is available that includes both a target outcome value (i.e., an actual remaining useful life for the machine or component), and one or more predictor values. The one or more feature values may include the unified slope, one or more values associated with specific features, and/or any other relevant information.

Figure 7:
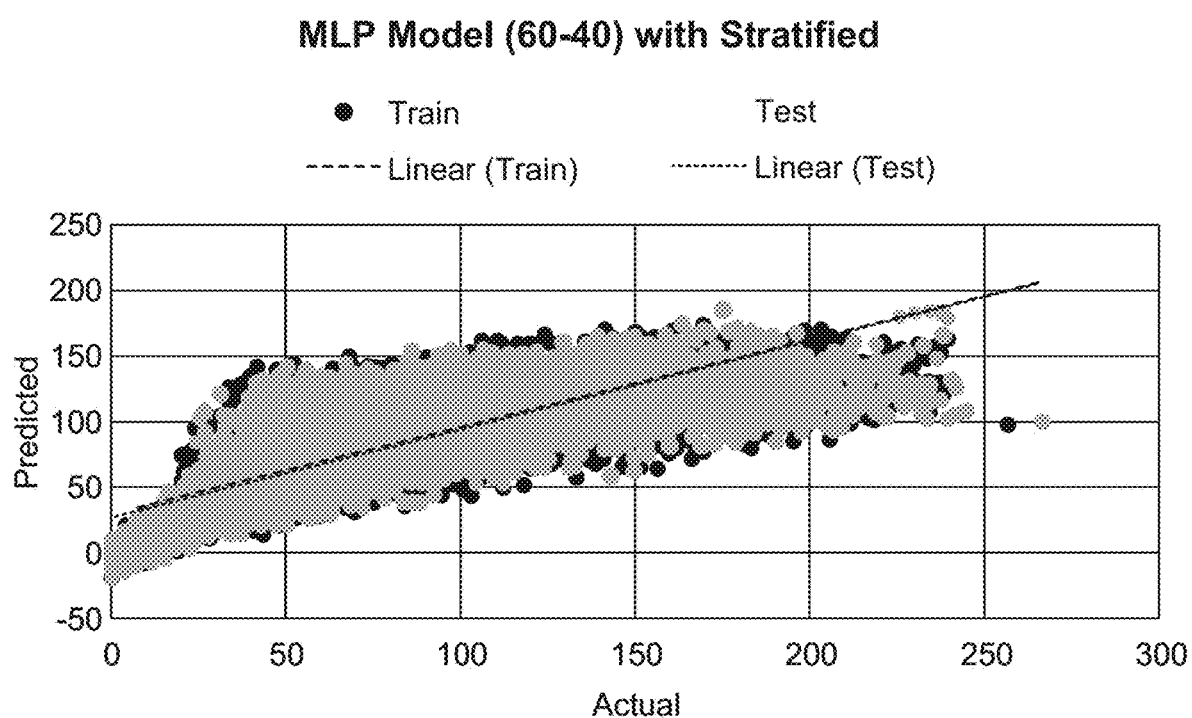
FIG. 7 illustrates a plot related to the prediction of remaining useful life, generated in accordance with one or more embodiments.

FIG. 7 illustrates a plot related to the prediction of remaining useful life, generated in accordance with one or more embodiments. When the method illustrated in FIG. 3A and FIG. 3B for a single machine is repeated for many machines that either have failed or that are predicted to fail at a particular point in time, then that data may be used to train a model such as a support vector regression, multi-layer perceptron (MLP), or other type of prediction model. FIG. 7 plots the values predicted by such a model (in this case a multi-layer perceptron) on the y-axis against the actual values in the test data on the x-axis. In this particular example, the $R^2$ value exceeds 0.68 in both the training and test phase.

Figure 4:
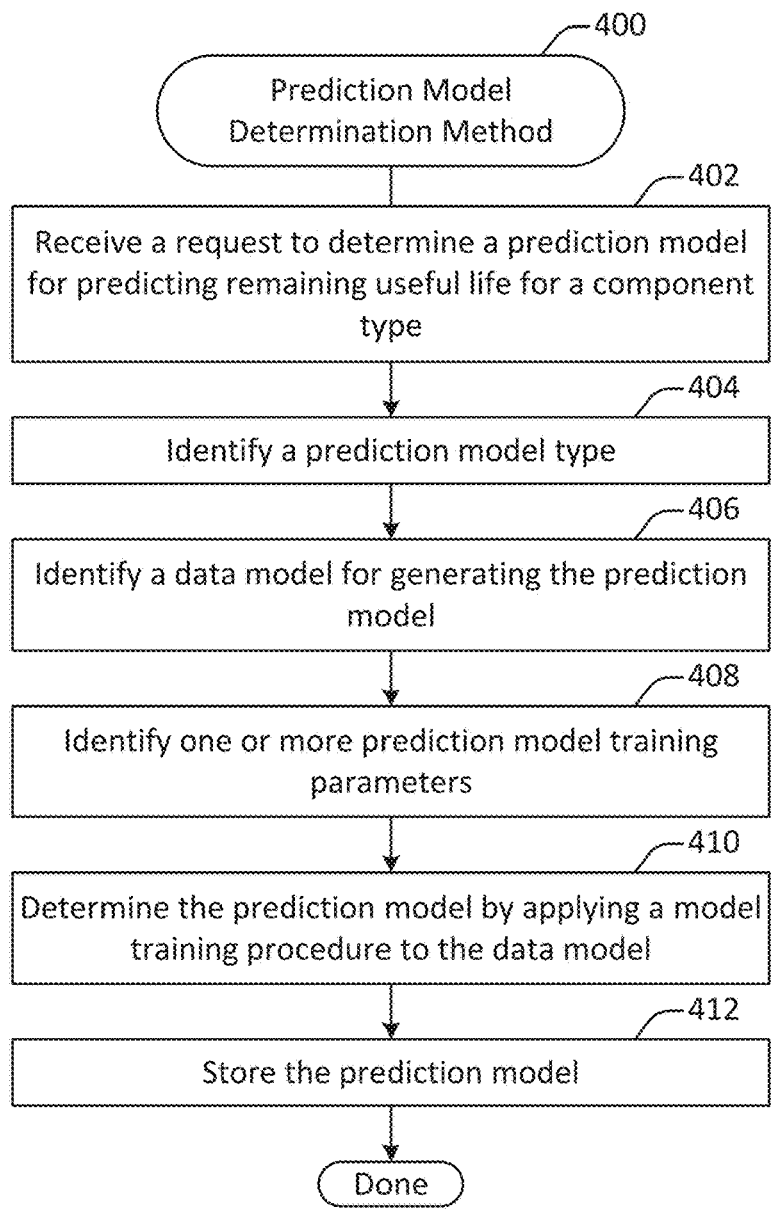
FIG. 4 illustrates an example of a method for determining a prediction model, performed in accordance with one or more embodiments.

FIG. 4 illustrates an example of a method 400 for determining a prediction model, performed in accordance with one or more embodiments. The method 400 may be performed on any suitable computing device. For instance, the method 400 may be performed on a controller in communication with one or more mechanical devices that collectively form part of a manufacturing process.

A request to determine a prediction model for predicting remaining useful life for a component type is received at 402. In some embodiments, the request may be generated automatically or based on user input. For example, an administrator may initiate a training procedure for remaining useful life for a component type. As another example, a prediction model may be periodically trained and re-trained as new historical data is determined.

A prediction model type is identified at 404. According to various embodiments, any of a variety of prediction models may be used. For instance, a neural network such as a deep learning model may be used to predict remaining useful life. Alternatively, or additionally, other types of supervised machine learning models may be employed. Examples of such models include gradient descent models, tree-based (e.g., random forest) models, and regression-based models. The prediction model type may be identified based on, for instance, computing programming code, one or more configuration parameters, user input, or a combination thereof.

A data model for generating the prediction model is identified at 406. According to various embodiments, the data model may be generated as discussed with respect to the method 200 shown in FIG. 2. Thus, operation 406 may involve identifying a pre-determined data set that was generated for the component type identified in the request received at operation 402.

One or more prediction model training parameters are identified at 408. In some implementations, the prediction model training parameters may include information such as a loss function, a number of training iterations, a data split between training and test, and other such information. Prediction model training parameters may be identified based on, for instance, computing programming code, one or more configuration parameters, user input, or a combination thereof.

The prediction model is determined at 410 by applying a model training procedure to the data model. According to various embodiments, the model training procedure may depend on the prediction model type identified at 404. For instance, different training procedures may be used for different types of prediction models.

In some embodiments, determining the prediction model may involve using any of a variety of predictors to predict remaining useful life as a target variable. The target variable may be embodied in both actual failure events, identified as discussed with respect to operation 212 in FIG. 2, as well as estimated component condition information, identified as discussed with respect to operation 210 in FIG. 2. The target variable may be predicted using information such as the time series data determined as discussed in operations 206 and 208 in FIG. 2, as well as historical values for the target variable. For instance, both time series data and remaining useful life estimates from an earlier period of time may be used to predict future remaining useful life estimates and/or mechanical component failure events.

The prediction model is stored at 412. According to various embodiments, the prediction model may be stored so that it may later be used to determine a prediction of remaining useful life for a mechanical component. An example of such a process is described with respect to the method 500 shown in FIG. 5.

Figure 5:
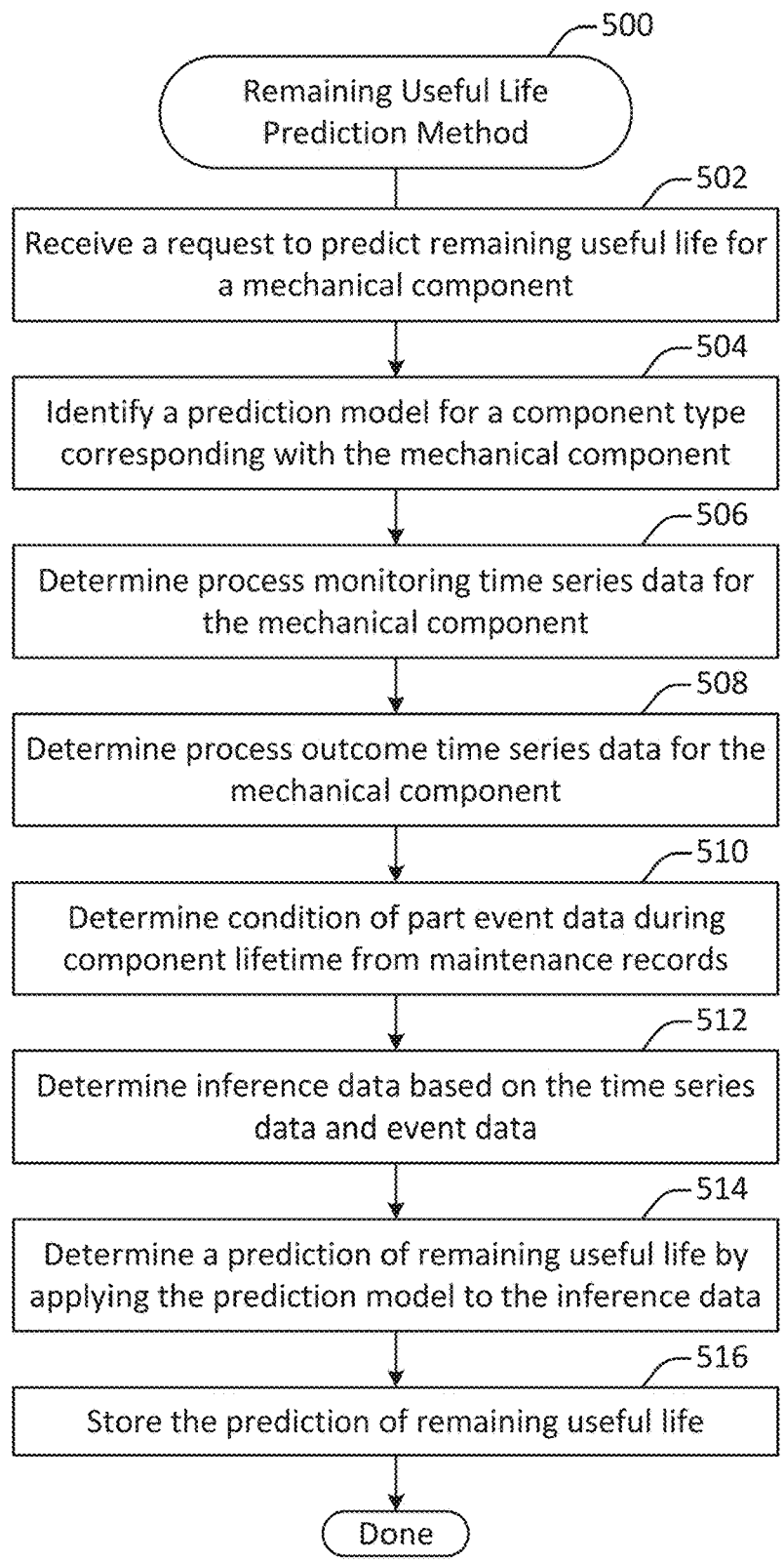
FIG. 5 illustrates an example of a method for applying a prediction model, performed in accordance with one or more embodiments.

FIG. 5 illustrates an example of a method 500 for applying a prediction model, performed in accordance with one or more embodiments. The method 500 may be performed on any suitable computing device. For instance, the method 500 may be performed on a controller in communication with one or more mechanical devices that collectively form part of a manufacturing process.

A request to predict remaining useful life for a mechanical component is received at 502. According to various embodiments, a request to predict remaining useful life for a mechanical component may be generated automatically, periodically, based on user input, or a combination thereof. For example, a request to predict remaining useful life for a mechanical component may be generated at periodic intervals for the component. As another example, a request to predict remaining useful life for a mechanical component may be generated when a machine in which the mechanical component is situated is scheduled for maintenance. As yet another example, a request to predict remaining useful life for a mechanical component may be generated when an error condition is detected, such as a change in process outcome or performance data for a particular machine. As still another example, a request to predict remaining useful life for a mechanical component may be generated when requested by a user.

A prediction model for a component type corresponding with the mechanical component is identified at 504. According to various embodiments, the prediction model may be generated as discussed with respect to the method 400 shown in FIG. 4. Thus, operation 504 may involve identifying a pre-trained prediction model that was generated for the component type identified in the request received at operation 502.

Process monitoring time series data for the mechanical component is determined at 506. Process outcome time series data for the mechanical component is determined at 508. Component condition event data is determined from maintenance records at 510. According to various embodiments, operations 506-510 may be performed in a manner substantially similar to operations 206-210 shown in FIG. 2.

Inference data is determined at 512 based on the time series data and the event data. In some embodiments, determining the inference data may involve combining the data identified at operations 506-510 into a format similar to that reflected in the data model determined in FIG. 2. In this way, the trained prediction model may be applied to the inference data. A prediction of remaining useful life is determined at 514 by applying the prediction model to the inference data.

The prediction of remaining useful life is stored at 516. According to various embodiments, the prediction of remaining useful life may be stored on a storage device such as a hard drive. Alternatively, or additionally, the prediction of remaining useful life may be transmitted via a communication interface to a remote computing device. For instance, the prediction of remaining useful life may be sent in a warning message indicating that the prediction of remaining useful life is below a designated threshold, which indicates that the component should be replaced, that a machine within which the component is located should be targeted for maintenance, or that some other action should be performed.

Figure 6:
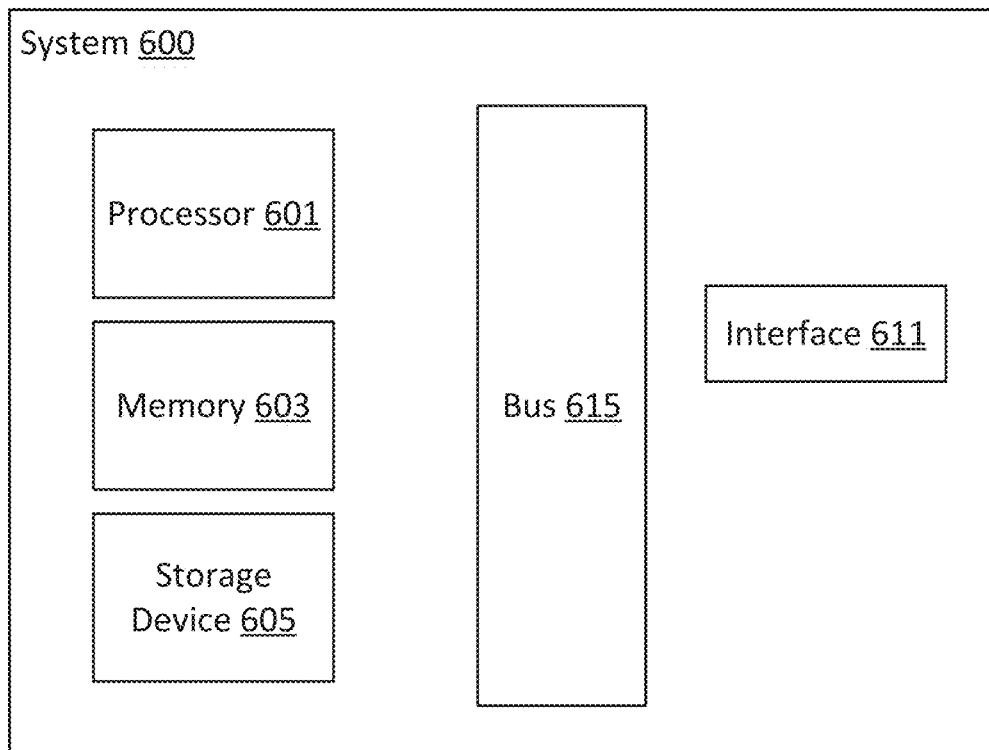
FIG. 6 illustrates one example of a computing device, configured in accordance with one or more embodiments.

FIG. 6 illustrates one example of a computing device. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such as an application server, a database server, or any other device or service described herein. Although a particular configuration is described, a variety of alternative configurations are possible. The processor 601 may perform operations such as implementing a prediction model, performing drift detection, and/or updating a prediction model. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user. In some embodiments, the computing device 600 may be implemented in a cloud computing environment.

Techniques and mechanisms described also herein provide for an automated framework for identifying and standardizing event data in mechanical components and machines by analyzing unstructured, semi-structured, and/or structured data. According to various embodiments, a domain-specific and potentially context-specific ontology may be constructed via a machine learning model such as deep-learning word-embedding. Textual information such as that included in maintenance records and other unstructured, semi-structured, or structured sources may then be vectorized using the constructed ontology. The resulting information may be clustered to identify machine and/or component condition information using a machine learning process. These techniques may be used to evaluate various types of records to determine, for instance, component condition information recorded by maintenance workers in unstructured text within maintenance records.

Figure 8:
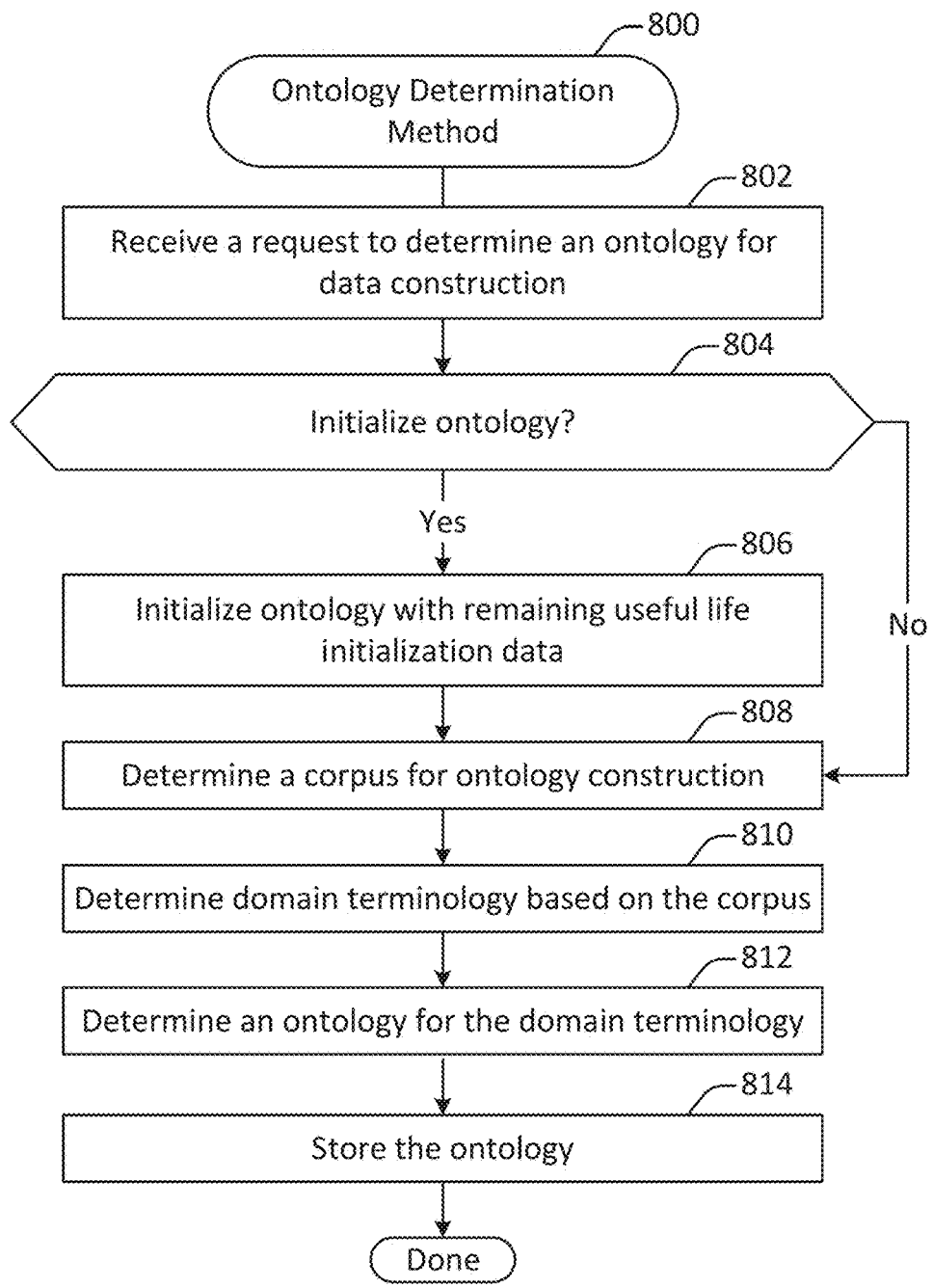
FIG. 8 illustrates an example of a method for remaining useful life data construction, performed in accordance with one or more embodiments.

FIG. 8 illustrates an example of a method 800 for determining an ontology for remaining useful life data construction, performed in accordance with one or more embodiments. The method 800 may be performed at any suitable computing device to analyze one or more unstructured, semi-structured, and/or structured data sources to identify words, phrases, and concepts suitable for use in predicting remaining useful life associated with one or more mechanical components and/or machines. For instance, the method 800 may be used to facilitate the determination of component condition event data at 210 and/or mechanical component failure event data at 212.

A request to determine an ontology is received at 802. In some implementations, the request may be generated as discussed with respect to operation 802 shown in FIG. 8. The request may be generated at least in part based on user input. For instance, an administrator may initiate a request to determine an ontology in a particular context. Alternatively, the request may be generated at least in part based on an automated process. For instance, an ontology may be periodically updated, for example when new data sources are received.

A determination is made at 804 as to whether to initialize the remaining useful life ontology. According to various embodiments, the determination may be made based on whether initialization data is available. For example, in an established industry such as the automotive industry, components may be associated with standard language for estimating remaining useful life associated with various components.

If the determination is made to initialize the ontology, then the ontology is initialized with remaining useful life data at 806. For example, a remaining useful life ontology may be seeded with predetermined estimates of remaining useful life and their associated indicators in structured, semi-structured, and/or unstructured data. This initialized model may then be used as a basis for the concepts determined at 812 as well as the linkages between terminology determined at 810 and concepts determined at 812.

A corpus for ontology construction is determined at 808. According to various embodiments, the corpus may include information specific to a particular context. For instance, a context may identify a particular organization, factory building, machine type, and/or component type. A corpus may include information such as documents describing industry standards, catalogues of parts, bills of materials, technical manuals, manuals describing standard operating procedures, service records, warranty records, and the like. Such information is often stored in a digital and text-based format but is often relatively unstructured. The corpus may be determined by performing a search of a storage location. Alternatively, or additionally, user input may assist in identifying relevant documents.

Domain terminology is determined based on the corpus at 810. According to various embodiments, determining domain terminology may involve identifying domain-specific terms. Various approaches to determining domain terminology may be used. For example, relevant terms can be determined by calculating the term-frequency/inverse document-frequency values for terms that appear in a particular corpus. As another example, relevant terms can be determined by applying the C-value/NC-value method. The C-value enhances a statistical measure of frequency of occurrence for term extraction by aiding in the identification of multi-word, nested terms. The NC-value then provides for the extraction of term context words (i.e., words that tend to appear with terms) and the incorporation of information from term context words to the extraction of terms. As yet another example, synonyms may be identified by, for instance, identifying words that commonly substitute for one another. As still another example, less relevant words such as stop words may be identified and removed.

An ontology for the domain terminology is determined at 812. In some implementations, determining an ontology may involve training a word2vec model. The word2vec model may be a neural network that takes as its input the corpus identified at 808 and produces a multi-dimensional vector space with unique words in the corpus being assigned a corresponding vector in the space. Word vectors are positioned in the vector space such that words that share common contexts in the corpus are located close to one another in the space.

In some embodiments, determining an ontology for the domain may involve performing one or more pre-processing operations on the text. For example, words may be stemmed. As another example, one or more stop words may be removed.

In particular embodiments, the word2vec model may represent not only individual words, but also phrases, which may also be known as N-grams. For instance, a recurring combination of two, three, four, or more words may map to a particular vector within a vector space.

The ontology is stored at 814. According to various embodiments, the ontology may be stored on a storage device so that it can be applied to a data source to identify words, phrases, and concepts in the ontology within the data source. For instance, the ontology may be stored as a word2vec model that may then be applied to a data source to determine a vectorization of the data source.

Figure 9:
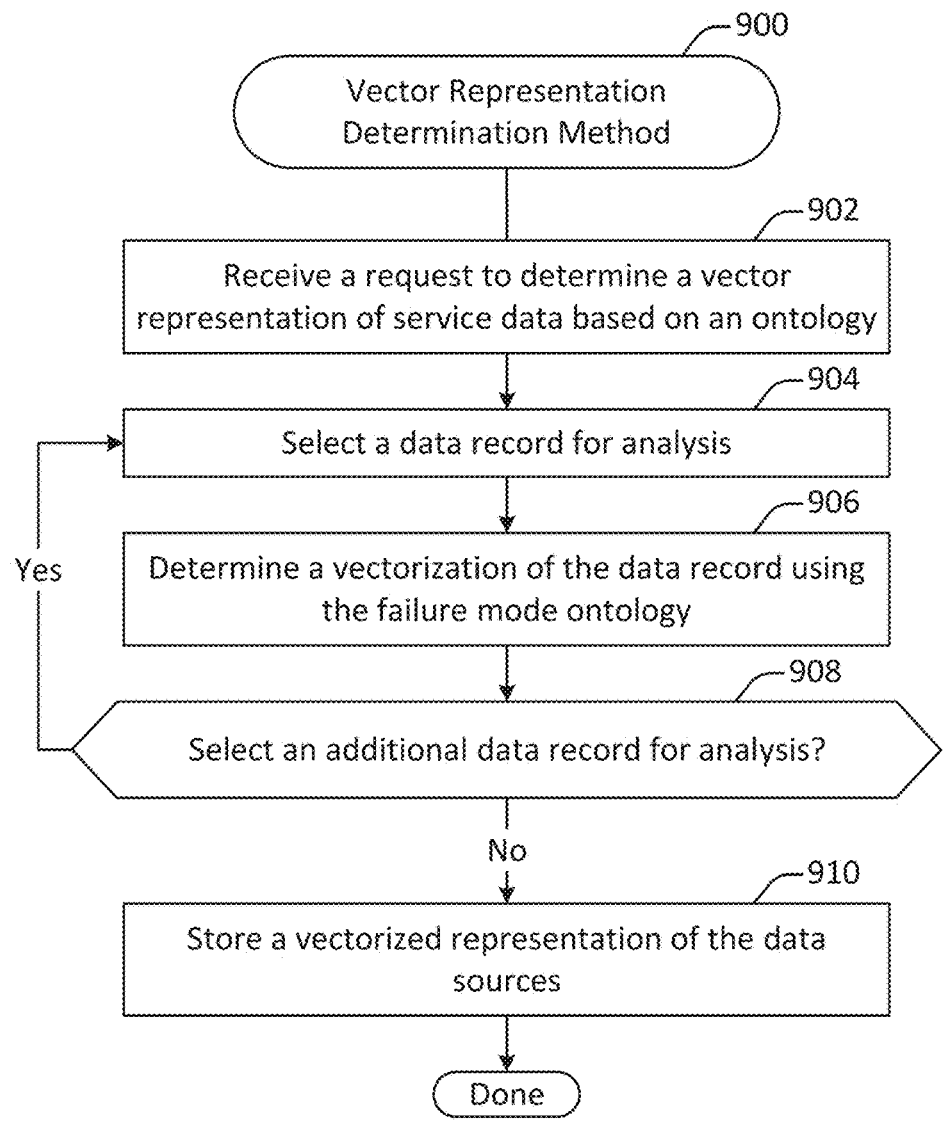
FIG. 9 illustrates a method for determining a remaining useful life vector representation, performed in accordance with one or more embodiments.

FIG. 9 illustrates a method 900 for determining a vector representation of service data, performed in accordance with one or more embodiments. The method 900 may be performed on any suitable computing device to apply the ontology determined in the method 800 to one or more data sources. The method 900 may be used in conjunction with other methods described herein. For example, the method 900 may be used to identify a failure event at operation 212. As another example, the method 900 may be used to facilitate the determination of condition of part event data at operation 510, which may be indicative of a particular remaining useful life.

A request to determine a vector representation of service data based on an ontology is received at 902. In some implementations, the request may be generated as discussed with respect to the operations 508 and 510 shown in FIG. 5 and/or operations 206-212 shown in FIG. 2. The request may identify one or more data sources to which to apply the ontology.

A data record is selected for analysis at 904. In some implementations, the data records analyzed in the method 900 may include some or al of the data sources used to construct the ontology in the method 800 shown in FIG. 8. Alternatively, or additionally, other data sources may be used.

In some embodiments, the method 900 may be applied to data records that are particularly indicative of mechanical component or machine failure, such as maintenance and/or warranty records. Maintenance and/or warranty records may include information about scheduled or unscheduled maintenance or replacement of machines or components within machines. Such records may include various types of information, For example, records may include a date and/or time of service. As another example, records may identify a machine type or component type associated with a machine or component. As another example, records may identify a particular machine or component (e.g., by serial number). A machine or component may be identified in a service record if it failed, was replaced, was repaired, or was otherwise referenced in a maintenance report. As yet another example, records may identify symptoms of a problem, defects identified during maintenance, and/or remedies applied to address the problem. As still another example, records may identify machine or component downtime, cost associated with repairs, or other such information.

In some embodiments, maintenance and/or warranty records may be embodied in unstructured data such as text. Alternatively, or additionally, records may be semi-structured. For instance, maintenance records may include a number of fields such as "Machine serial number", "Symptoms", "Date", and "Remedy", with the content of some or all of those fields being unstructured text. As still another possibility, some portion of maintenance records may be structured. For instance, fields such as date and serial number may be structured (e.g., in a database system) while other fields may be in a text-based format.

In some embodiments, a data record may be, for instance, a particular maintenance record. The data record may include one or more text components. Additionally, the data record may include metadata such as a date, a component identifier, and the like. Thus, a single data record may potentially include more than one vectorization, for instance corresponding to different text fields associated with the record.

A vectorization of the data source is determined at 906 using the ontology. According to various embodiments, the vectorization may be determined by applying the ontology to the data record. For instance, a trained word2vec model may be applied to text included in the data record to determine a vector representation of all or a portion of the data source.

In some implementations, the vector representation may include potentially many vectors for a given data record. For instance, different words within the data record may be represented as different vectors into a multi-dimensional vector space.

A determination is made at 908 as to whether to select an additional data source for analysis. According to various embodiments, data sources may continue to be selected until all data sources identified at 902 have been analyzed. Data sources may be identified in any suitable order, in sequence or in parallel.

A vectorized representation of the data source is stored on a storage device at 910. According to various embodiments, the vectorized representation may be a structured data set that includes a vector corresponding to a particular data source. The structured data set may also include, for a given observation, metadata such as a date, a component identifier, and the like.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
receiving via a communication interface a designated time series data set associated with a mechanical process performed by a designated machine including a designated component corresponding with a designated component type, the designated time series data including process outcome data characterizing one or more outcomes of the mechanical process;
identifying via a processor designated estimated condition information for the designated component at least in part by applying a predetermined ontology to text included in one or more maintenance records associated with the designated machine to produce a plurality of vector representations of the one or more maintenance records, each of the one or more maintenance records associated with a respective point in time;
determining via the processor an estimated remaining useful life for the designated component by applying a pre-trained prediction model to the designated estimated condition information and the designated time series data including the process outcome data, the pre-trained prediction model being trained to predict historical estimated condition information for a plurality of components of the designated component type using historical time series data associated with a plurality of machines that collectively include the plurality of components; and
storing the estimated remaining useful life on a storage device.

2. The method recited in claim 1, wherein the designated time series data includes process monitoring data collected over time from one or more sensors associated with the designated machine.

3. The method recited in claim 1, wherein the designated time series data includes process monitoring data indicating values for one or more control settings for the designated machine over time.

4. The method recited in claim 1, wherein the process outcome data includes product quality data for a product produced by the mechanical process.

5. The method recited in claim 4, wherein the product quality data includes a defect rate associated with the product.

6. The method recited in claim 1, wherein the one or more maintenance records include a designated maintenance record identifying a historical estimate of remaining useful life for the designated component at a designated point in time.

7. The method recited in claim 1, wherein the pre-trained prediction model is trained using mechanical component failure event data identifying a plurality of failure dates for a subset of the plurality of components.

8. A system comprising:
a communication interface configured to receive a designated time series data set associated with a mechanical process performed by a designated machine including a designated component corresponding with a designated component type, the designated time series data including process outcome data characterizing one or more outcomes of the mechanical process;
a processor configured to determine designated estimated condition information for the designated component at least in part by applying a predetermined ontology to text included in one or more maintenance records associated with the designated machine to produce a plurality of vector representations of the one or more maintenance records, each of the one or more maintenance records associated with a respective point in time, wherein the processor is further configured to determine an estimated remaining useful life for the designated component by applying a pre-trained prediction model to the designated estimated condition information and the designated time series data including the process outcome data, the pre-trained prediction model being trained to predict historical estimated condition information for a plurality of components of the designated component type using historical time series data associated with a plurality of machines that collectively include the plurality of components; and
a storage device configured to store the estimated remaining useful life.

9. The system recited in claim 8, wherein the designated time series data includes process monitoring data collected over time from one or more sensors associated with the designated machine.

10. The system recited in claim 9, wherein the designated time series data includes process monitoring data indicating values for one or more control settings for the designated machine over time.

11. The system recited in claim 10, wherein the designated time series data includes process outcome data characterizing one or more outcomes of the mechanical process.

12. The system recited in claim 11, wherein the process outcome data includes product quality data for a product produced by the mechanical process.

13. The system recited in claim 12, wherein the product quality data includes a defect rate associated with the product.

14. The system recited in claim 8, wherein the one or more maintenance records include a designated maintenance record identifying a historical estimate of remaining useful life for the designated component at a designated point in time.

15. The system recited in claim 8, wherein the pre-trained prediction model is trained using mechanical component failure event data identifying a plurality of failure dates for a subset of the plurality of components.

16. One or more non-transitory computer-readable media having instructions stored therein for performing a method, the method comprising:
receiving via a communication interface a designated time series data set associated with a mechanical process performed by a designated machine including a designated component corresponding with a designated component type, the designated time series data including process outcome data characterizing one or more outcomes of the mechanical process;

identifying via a processor designated estimated condition information for the designated component at least in part by applying a predetermined ontology to text included in one or more maintenance records associated with the designated machine to produce a plurality of vector representations of the one or more maintenance records, each of the one or more maintenance records associated with a respective point in time;

determining via the processor an estimated remaining useful life for the designated component by applying a pre-trained prediction model to the designated estimated condition information and the designated time series data including the process outcome data, the pre-trained prediction model being trained to predict historical estimated condition information for a plurality of components of the designated component type using historical time series data associated with a plurality of machines that collectively include the plurality of components; and storing the estimated remaining useful life on a storage device.

17. The one or more non-transitory computer-readable media recited in claim 16, wherein the designated time series data includes process monitoring data collected over time from one or more sensors associated with the designated machine.

18. The one or more non-transitory computer-readable media recited in claim 16, wherein the designated time series data includes process monitoring data indicating values for one or more control settings for the designated machine over time, wherein the designated time series data includes process outcome data characterizing one or more outcomes of the mechanical process.

19. The one or more non-transitory computer-readable media recited in claim 16, wherein the pre-trained prediction model is trained using mechanical component failure event data identifying a plurality of failure dates for a subset of the plurality of components.

* * * * *